US008477151B2

(12) United States Patent
He

(10) Patent No.: US 8,477,151 B2
(45) Date of Patent: Jul. 2, 2013

(54) BOUNDARY DELINEATION SYSTEM

(75) Inventor: Kan He, Chesterfield, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 722 days.

(21) Appl. No.: 12/273,202

(22) Filed: Nov. 18, 2008

(65) Prior Publication Data

US 2010/0123718 A1   May 20, 2010

(51) Int. Cl.
*G09G 5/00* (2006.01)
*G06F 17/00* (2006.01)
*G06T 11/20* (2006.01)

(52) U.S. Cl.
USPC ............ 345/619; 345/418; 345/440; 345/441

(58) Field of Classification Search
None
See application file for complete search history.

(56) References Cited

U.S. PATENT DOCUMENTS

| | | | |
|---|---|---|---|
| 5,299,128 A | 3/1994 | Antoine et al. | |
| 5,805,689 A | 9/1998 | Neville et al. | |
| 5,842,130 A | 11/1998 | Opresc-Surcobe et al. | |
| 7,099,677 B2 * | 8/2006 | Contractor | 455/461 |
| 7,167,706 B2 | 1/2007 | Deneberg et al. | |
| 7,245,925 B2 | 7/2007 | Zellner | |
| 7,254,485 B2 | 8/2007 | Rooney et al. | |
| 7,397,796 B1 | 7/2008 | Smiljanic | |
| 2004/0034666 A1 * | 2/2004 | Chen | 707/104.1 |
| 2004/0035029 A1 * | 2/2004 | Forsberg | 40/316 |
| 2006/0284962 A1 * | 12/2006 | Fram et al. | 347/171 |
| 2007/0112618 A1 * | 5/2007 | Krneta | 705/10 |

OTHER PUBLICATIONS

Godin, Lisa. GIS in Telecommunications. ESRI Press, 2001.*
"Thiessen Polygons" http://www.bbc.co.uk/dna/h2g2/A901937. Archived on Feb. 23, 2005. Retrieved on Aug. 16, 2011 from <http://web.archive.org/web/20050223183605/http://www.bbc.co.uk/dna/h2g2/A901937>.*
Godin, Lisa. GIS in Telecommunications. ESRI Press, 2001. (Selected Pages).*
"Rooftop Money-Makers" http://cooperator.com/articles/623/1/Rooftop-Money-Makers/Page1.html. Archived on May 14, 2007. Retrieved on Aug. 16, 2011 from <http://web.archive.org/web/20070514061507/http://cooperator.com/articles/623/1/Rooftop-Money-Makers/Page1.html>.*
"Service Area Map" http://unityhealth.com/AboutUs/ServiceArea/index.htm. Archived on Jun. 4, 2008. Retrieved on Sep. 29, 2012 from <http://web.archive.org/web/20080603012848/http://unityhealth.com/AboutUs/ServiceArea/index.htm>.*

(Continued)

*Primary Examiner* — Kee M Tung
*Assistant Examiner* — Zhengxi Liu
(74) *Attorney, Agent, or Firm* — Hanley, Flight & Zimmerman, LLC

(57) ABSTRACT

Methods and systems for boundary delineation are described. In one embodiment, a living unit identifier may be translated into a translated geographic location point. The living unit identifier may be within a distribution area. A closed plane living unit-based figure that bounds the translated geographic location point may be delineated. An additional closed plane living unit-based figure that bounds a geographic location point may be delineated. The geographic location point may be associated with an additional living unit identifier within the distribution area. The closed plane living unit-based figure and the additional closed plane living unit-based figure may be merged to create a distribution area figure of the distribution area. Additional methods and systems are disclosed.

33 Claims, 9 Drawing Sheets

OTHER PUBLICATIONS

"AddressBroker", [Online]. Retrieved from the Internet: <URL: http://www.centrus.com/AddressBroker.html>, (Oct. 15, 2008), 2 pgs.

"AddressBroker Features and Benefits", [Online]. Retrieved from the Internet: <URL: http://www.g1.com/products/business-Geographics/AddressBroker/Features-and-Benefits/>, (Oct. 15, 2008), 1 pg.

"AddressBroker Product Screen", [Online]. Retrieved from the Internet: <URL: http://www.g1.com/Products/Business-Geographics/AddressBroker/>, (Oct. 15, 2008), 1 pg.

"Geographic Information System", [Online]. Retrieved from the Internet: <URL: http://en.wikipedia.org/w/index.php?title=Geographic_information_system&printable=yes>, (Oct. 17, 2008), 16 pgs.

Ahern, Shane, et al., "World Explorer: Visualizing Aggreate Data from Unstructured Text in Geo-Referenced Collections", *JCDL '07* Jul. 18-23, Vancouver, British Columbia, (2007), 1-10.

Aurenhammer, Franz, "Voronoi Diagrams—A Survey of a Fundamental Geometric Data Structure", *ACM Computing Surveys*, vol. 23, No. 3, (Sep. 1991), 345-405.

Khayam, Syed A., et al., "Markov-Based Modeling of Wireless Local Area Networks", *MSWiM'03* San Diego, California USA, (Sep. 19, 2003), 100-107.

Martin, Robin, et al., "Semi-Automatic Feature Delineation in Medical Images", *Australasian Symposium on Information Visualisation. Conferences in Research and Practice in Information Technology*, vol. 35., (2004), 127-131.

Placios-Velez, Oscar, et al., "A Dynamic Hierarchical Subdivision Algorithm for Computing Delaunay Triangulations and Other Closest-Point Problems", *ACM Transactions on Mathematical Software*, vol. 16, No. 3, (Sep. 1990), 275.292.

Renka, Robert J., "Algorithm 772: STRIPACK: Delaunay Triangulation and Voronoi Diagram on the Surface of a Sphere", *ACM Transactions on Mathematical Software*, vol. 23 No. 3., (Sep. 1997), 416-434.

Ukkonen, Thomas, et al., "Distributed Computation of Drainage Basin Delineations from Uncertain Digital Elevation Models", *Proceedings of the 15th International Symposium of Advances in Geographic Information Systems ACM GIS*, (2007), 1-8.

* cited by examiner

BOUNDARY DELINEATION SYSTEM

FIELD

This application relates to method and systems for data mapping, and more specifically to methods and systems for boundary delineation.

BACKGROUND

An organization may provide service to customers in one or more geographic areas. The organization may produce a graphical representation of the locations of the customers and/or the geographic areas which the organization serves.

BRIEF DESCRIPTION OF THE DRAWINGS

Some embodiments are illustrated by way of example and not limitation in the figures of the accompanying drawings in which.

DETAILED DESCRIPTION

Example methods and systems for boundary delineation are described. In the following description, for purposes of explanation, numerous specific details are set forth in order to provide a thorough understanding of example embodiments. It will be evident, however, to one of ordinary skill in the art that embodiments of the invention may be practiced without these specific details.

The methods and systems may eliminate manually drawing figures that delineate boundaries on a boundary map by enabling automated creation. The manually drawn figures may be based on human guesswork that results in erroneous data. The manually drawn figures may be difficult to update. The automated creation may create boundary maps wherein the delineated figures are smoother, more accurate, and graphically more pleasant than manually drawn figures.

The boundary map may include distribution areas (DAs) delineating where certain services are offer and/or provided. An example use of the boundary map is with respect to land-line telephones and other copper access network related applications. The accuracy of the DA boundaries may be used in determining telecom service connectivity and product availability.

The methods and systems may create a highly automated process of delineating boundaries, based on telecom service data extracted from existing living units across the areas serviced by an entity or organization. The process may eliminate potential network association commission/omission errors introduced via a manual approach and increase the efficiency of future boundary update processes.

From a geographic point-of-view, the DA may be an area that encompasses the living units served by a cross box. The demarcation line between two adjacent DAs may be equidistant from the edge of adjacent living units. The methods and systems may first translate the existing living unit service addresses into a geographic location point with a DA name explicitly attached. The methods and systems may then create Thiessen polygons based on the generated living unit points. Adjacent Thiessen polygons may be merged with the same DA name to form a final DA polygon.

In an example embodiment, the methods and systems may reduce the cost and time used for generating/updating DA boundary files and creating a resulting boundary map. The methods and systems may increase the accuracy of DA boundaries and create a more efficient means of DA boundary updating processes.

The process may enable accurate delineation of boundaries for the cross boxes of a service provider. The boundary map may be used, by way of example, to identify an area geographically if there is a problem with connectivity of land-line telephone services. The boundary map may be used to determine where to make a fiber connection from a central office to a cross box. The boundary may be used to make planning decisions by an entity or organization.

Figure 1:
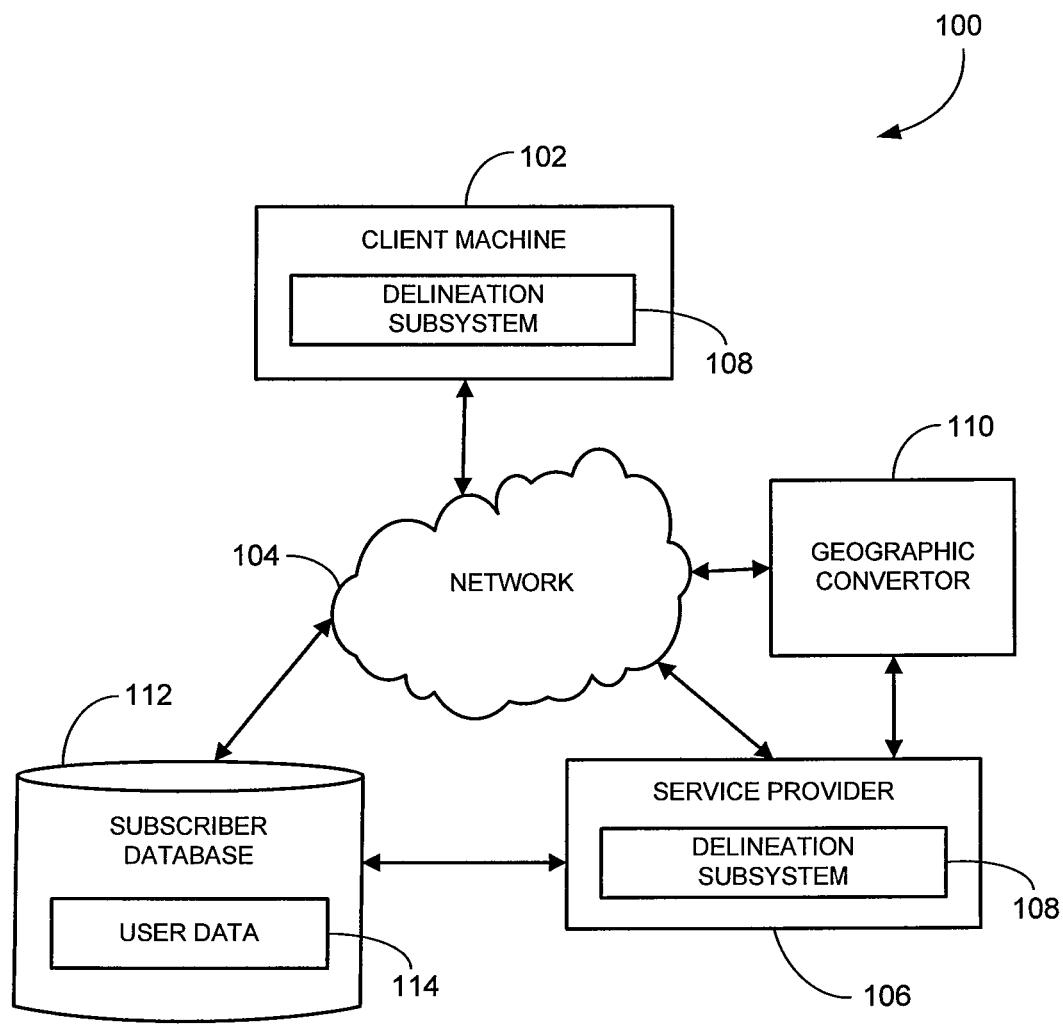
FIG. 1 is a block diagram of a system, according to an example embodiment.

FIG. 1 illustrates an example system 100 in which a user may operate a client machine 102 to communicate over a network 104 with a service provider 106 to delineate boundaries. The system 100 may enable a user of an organization or entity associated with the service provider 106 to delineate boundaries on a boundary map by directly communication with the service provider 106, or communicating with the service provider 106 from the client machine 102.

Examples of the client machine 102 include a set-top box, a gaming unit, a receiver card, a set-top box (STB) a mobile phone, a personal digital assistant (PDA), a display device, a generic computing system, or the like. Other devices may also be used.

The network 104 over which the client machine 102 and the service provider 106 are in communication may include a Global System for Mobile Communications (GSM) network, an Internet Protocol (IP) network, a Wireless Application Protocol (WAP) network, a WiFi network, or an IEEE 802.11 standards network, as well as various combinations thereof. Other conventional and/or later developed wired and wireless networks may also be used.

The service provider 106 may be a computing system or other computing device operated or under control of AT&T, or another telecommunication entity or non-telecommunication entity. The service provider 106 may be in a client-server relationship, peer-to-peer, or different type of relationship with the client machine 102.

A delineation subsystem 108 may be deployed in the client machine 102 and/or the service provider 106 to indicate or represent boundaries on a boundary map by lines. The boundaries may be delineated for distribution areas on a boundary map, or may be otherwise delineated.

The service provider 106 may be in communication with a database 112. The database may include user data 114 regarding users of the entity or organization associated with the service provider 106. The user data 114 may include the services for which various users are subscribed and/or how the users connect to a central office of the entity or organization. For example, the user data 114 may include how a user connects to a terminal, a cross box, and the central office. The user data 114 may then include, by way of example, a relationship table that defines the relationships (e.g., the terminal that is associated with a particular living unit). In an example embodiment, the user data 114 may include mailing addresses of the users, but may not include the geographic locations of the customers.

A geographic converter 110 may be in communication over the network 104 with the client machine 102 and/or the service provider 106. The geographic converter 110 may receive a living unit identifier (e.g., a living unit address) and/or a telephone number and provide a translated geographic location point in response. The service provider 106 and the geographic convertor 110 may be operated or otherwise controlled by a single entity. In an example embodiment, the geographic converter 110 may be ADDRESSBROKER by Group 1 Software, Inc. However, other geographic converters also be used.

Figure 2:
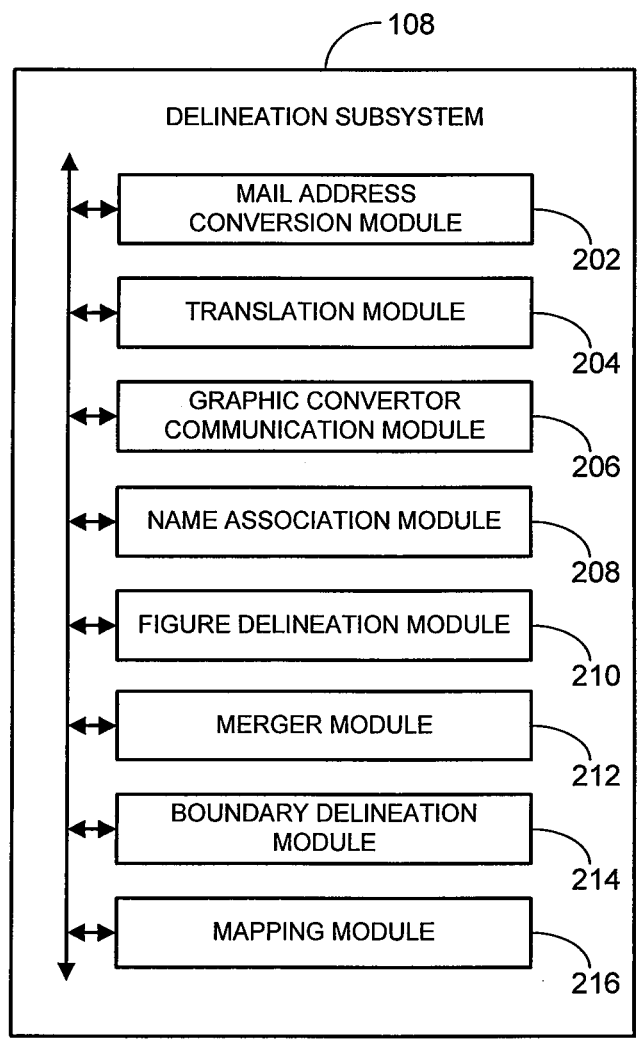
FIG. 2 is a block diagram of an example delineation subsystem that may be deployed within the system of FIG. 1, according to an example embodiment.

FIG. 2 illustrates an example delineation subsystem 108 that may be deployed in the client machine 102 and/or the service provider 106 of the system 100 (see FIG. 1), or otherwise deployed in another system. The delineation subsystem 108 may include a mail address conversion module 202, a translation module 204, a graphic convertor communication module 206, a name association module 208, a figure delineation module 210, a merger module 212, a boundary delineation module 214, and/or a mapping module 216. Other modules may also be included. In various embodiments, the modules may be distributed so that some of the modules may be deployed in the client machine 102 and some of the modules may be deployed in the service provider 106.

The mail address conversion module 202 accesses mailing addresses and/or associated telephone numbers of users from the subscriber database 112 (see FIG. 1) and converts the mailing addresses to living unit identifiers. The living unit identifiers may include the associated telephone numbers.

The translation module 204 translates a living unit identifier into a translated geographic location point and/or translates an additional living unit identifier into a geographic location point. The translation of the living unit identifier may use a result of conversion of the mailing address by the module 202.

The graphic convertor communication module 206 provides a living unit identifier to the geographic convertor 110 (see FIG. 1) and receives a translated geographic location point from the geographic convertor 110 in response and/or provides the additional living unit identifier to the geographic convertor 110 and receives the geographic location point from the geographic convertor 110 in response. The name association module 208 associates a distribution area name with the translated geographic location point. Thus, the living unit may be in a particular distribution area with other geographic location points.

The figure delineation module 210 delineates a closed plane living unit-based figure that bounds the translated geographic location point and/or delineates an additional closed plane living unit-based figure that bounds a geographic location point. The geographic location point may be associated with an additional living unit identifier within the distribution area. The delineation of the additional closed plane living unit-based figure may be based on a result of the translation of the additional living unit identifier.

The merger module 212 merges the closed plane living unit-based figure and the additional closed plane living unit-based figure to create a distribution area figure of the distribution area and/or merges the distribution area figure of the distribution area and an additional distribution area figure of an additional distribution area to create a coverage area figure.

The boundary delineation module 214 delineates distribution area boundaries on the boundary map. The distribution area figure may be within a particular distribution area boundary of the distribution area boundaries. The mapping module 216 renders a boundary map and/or adds the distribution area figure to a boundary map.

Figure 3:
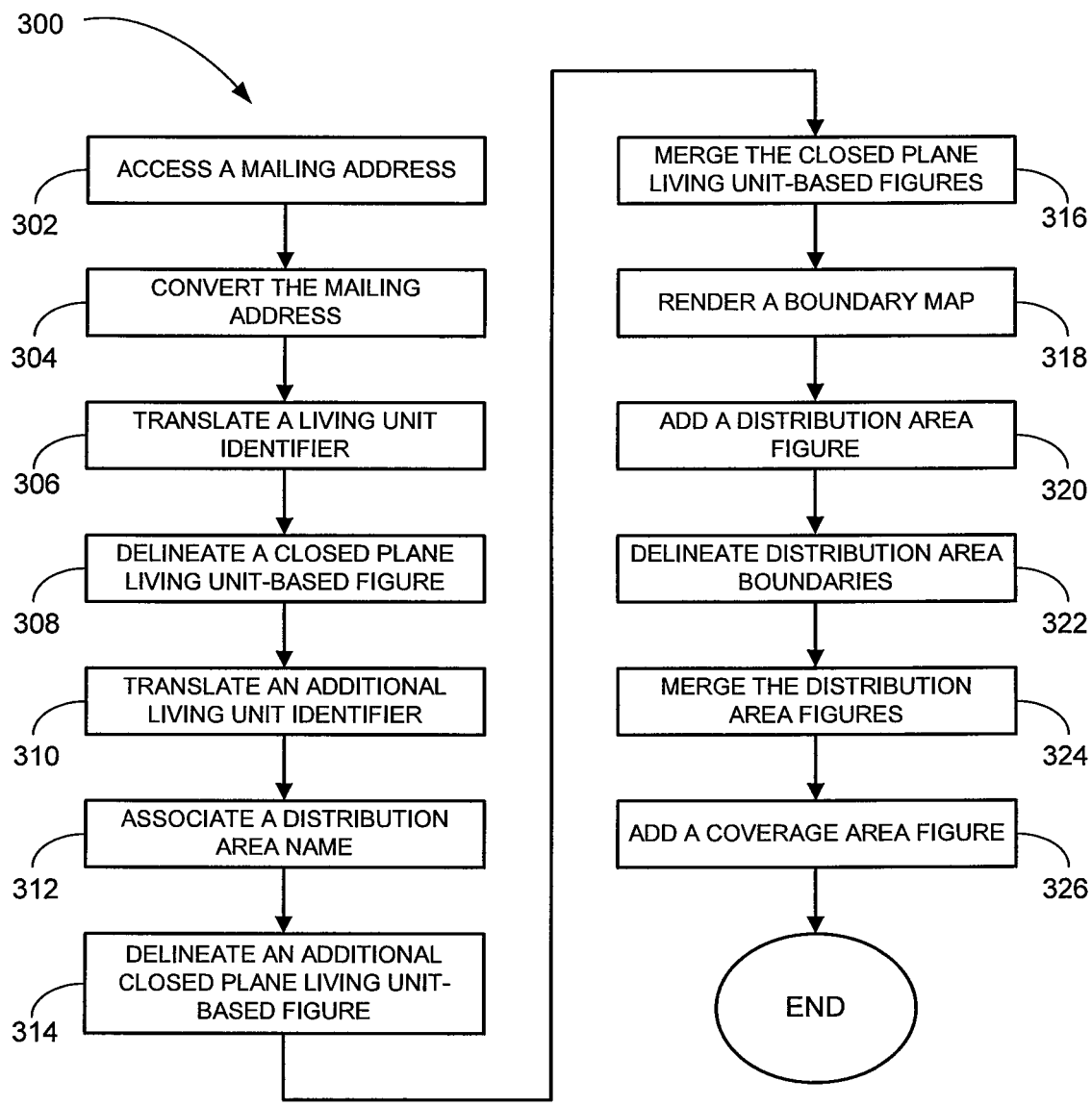
FIGS. 3 and 4 are flowcharts illustrating a method for figure delineation, according to example embodiments.

FIG. 3 illustrates a method 300 for figure delineation according to an example embodiment. The method 300 may be performed by the client machine 102 and/or the service provider 106 of the system 100 (see FIG. 1), or otherwise performed.

A mailing address and/or an associated telephone number of a user may be accessed from the subscriber database 112 (see FIG. 1) at block 302. The mailing address may be part of the user data 114 (see FIG. 1) that is stored by the entity or organization associated with the service provider 106.

The mailing address may be converted to a living unit identifier at block 304. The living unit identifier may be associated with a home address (e.g., a residence) or a business address (e.g., an office building). The living unit identifier may include the associated telephone number. The format of a living unit identifier may be the same as or different from the format of a mailing address. In an example embodiment, the mailing address may be used for the billing purpose (e.g., a P.O. Box is possible) while the living unit identifier may represent the service location (e.g., a P.O. Box is not allowed).

The living unit identifier is translated into a translated geographic location point at block 306. Geographic location points may be in latitude and longitude format or a different geographic format. The living unit identifier may be within a particular distribution area. The translation of the living unit identifier may use a result of the conversion of the mailing address.

A closed plane living unit-based figure that bounds the translated geographic location point is delineated at block 308. The closed plane living unit-based figure may be a living unit-based polygon or shaped otherwise. The operations at block 308 may delineate the area for a particular living unit as a polygon.

Additional living unit identifiers and/or additional telephone numbers may be translated into additional geographic location points at block 310.

The distribution area name may be associated with the translated geographic location point and/or the geographic location points at block 312. The association of the distribution area name may identify the particular geographic location points as being in the same distribution area.

An additional closed plane living unit-based figure that bounds a geographic location point is delineated at block 314. The geographic location point associated with an additional living unit identifier may be within the distribution area. The delineation of the additional closed plane living unit-based figure may use a result of the translation of the additional living unit identifier. The additional closed plane living unit-based figure may be an additional living unit-based polygon or shaped otherwise.

In an example embodiment, the living unit-based polygon and/or the additional living unit-based polygon may be Thiessen polygons; however, other types of polygons may also be used. The Thiessen polygons may be polygons whose boundaries define the area that is closest to each point relative to all other points. They may be mathematically defined by the perpendicular bisectors of the lines between all points.

At block 316, the closed plane living unit-based figure and the additional closed plane living unit-based figure are merged to create a distribution area figure of the distribution area. The distribution area figure may be a distribution area polygon or may be shaped otherwise.

A boundary map may be rendered at block 318. The boundary map may be rendered based on subscriber data, geographic data, and the like. The distribution area figure may be added to the boundary map at block 320.

A number of distribution area boundaries may be delineated on the boundary map at block 322. The distribution area figure may be within a particular distribution area boundary of the of distribution area boundaries.

At block 324, the distribution area figure of the distribution area and an additional distribution area figure of an additional distribution area may be merged to create a coverage area figure. The coverage area figure may be added to the boundary map at block 326.

In an example embodiment, land-line telephone service for a number of living unit identifiers within the distribution area including the living unit identifier and the additional living unit identifier may be served by the same cross-box.

In an example embodiment, the creation of the distribution area figure by the method 300 may eliminate the potential error of living units assigned to wrong DAs (both commission and omission errors) by being living-unit based.

Figure 4:
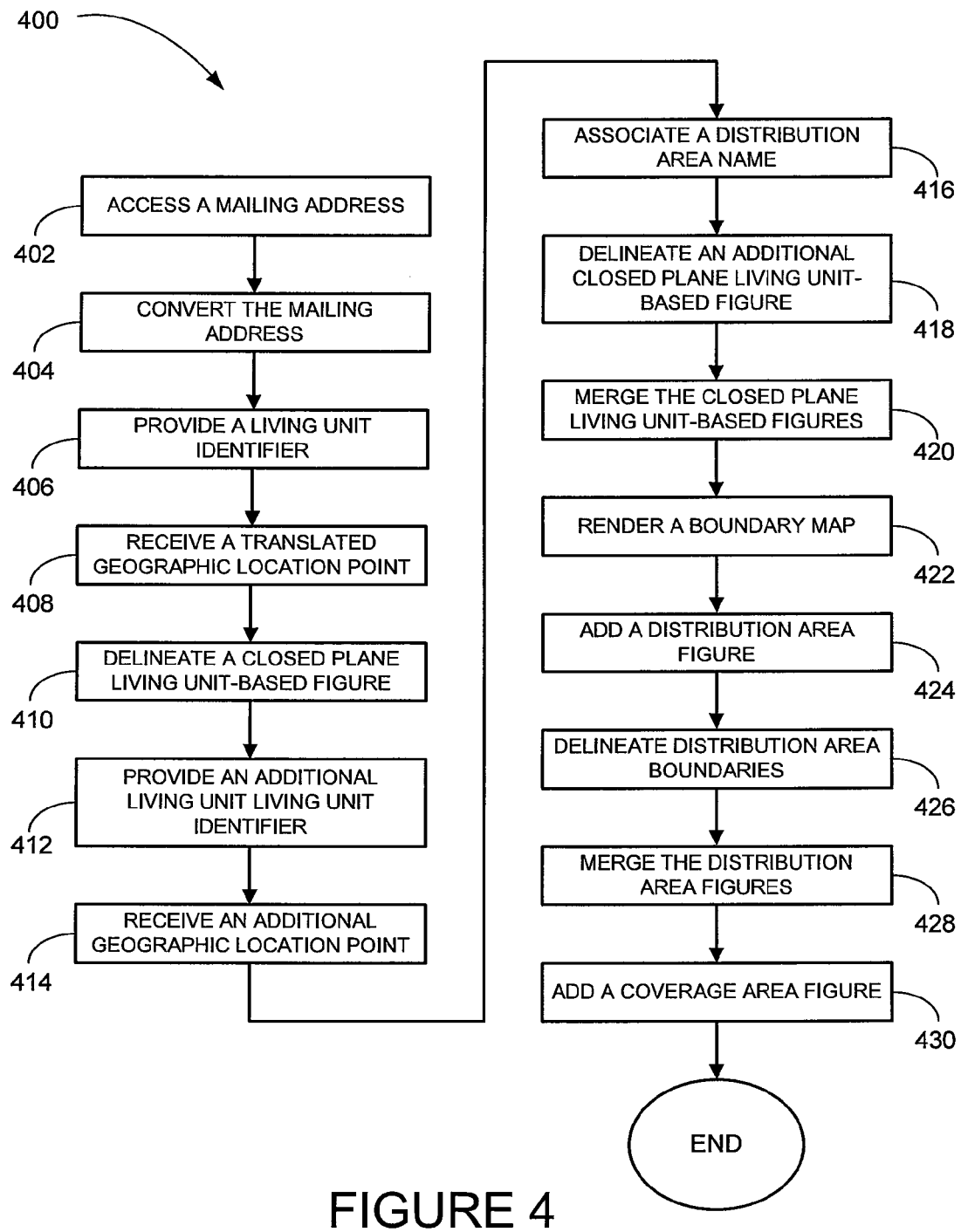

FIG. 4 illustrates a method 400 for figure delineation according to an example embodiment. The method 400 may be performed by the client machine 102 and/or the service provider 106 of the system 100 (see FIG. 1), or otherwise performed.

The method 300 (see FIG. 3) may be used to translated living unit identifiers and/or telephone numbers to geographic points, while the method 400 may provide the living unit identifiers and/or telephone numbers to the geographic convertor 110 (see FIG. 1) for translation.

A mailing address and/or an associated telephone number of a user may be accessed from the subscriber database 112 (see FIG. 1) at block 402. The mailing address may be converted to the living unit identifier at block 404. The living unit identifier may be associated with a home address or a business address. The living unit identifier may include the associated telephone number.

The living unit identifier is provided to the geographic convertor 110 at block 406. A translated geographic location point is received from the geographic convertor 110 in response at block 408.

A closed plane living unit-based figure that bounds the translated geographic location point is delineated at block 410. The closed plane living unit-based figure may be a living unit-based polygon or shaped otherwise.

The additional living unit identifier and/or an additional telephone number may be provided to the geographic convertor at block 412. An additional geographic location point may be received from the geographic convertor 110 in response at block 414.

The distribution area name may be associated with the translated geographic location point and/or the geographic location point at block 416.

An additional closed plane living unit-based figure that bounds a geographic location point is delineated at block 418. The geographic location point associated with an additional living unit identifier may be within the distribution area. The delineation of the additional closed plane living unit-based figure may use a result of the translation of the additional living unit identifier. The additional closed plane living unit-based figure may be an additional living unit-based polygon or shaped otherwise.

At block 420, the closed plane living unit-based figure and the additional closed plane living unit-based figure are merged to create a distribution area figure of the distribution area. The distribution area figure may be a distribution area polygon or may be shaped otherwise.

A boundary map may be rendered at block 422. The distribution area figure may be added to the boundary map at block 424.

A number of distribution area boundaries may be delineated on the boundary map at block 426. The distribution area figure may be within a particular distribution area boundary of the of distribution area boundaries.

At block 428, the distribution area figure of the distribution area and an additional distribution area figure of an additional distribution area may be merged to create a coverage area figure. The coverage area figure may be added to the boundary map at block 430.

In an example embodiment, land-line telephone service for a number of living unit identifiers within the distribution area including the living unit identifier and the additional living unit identifier may be served by the same cross-box.

In an example embodiment, the creation of the distribution area figure by the method 400 may eliminate the potential error of living units assigned to wrong DAs (both commission and omission errors) by being living-unit based.

Figure 5:
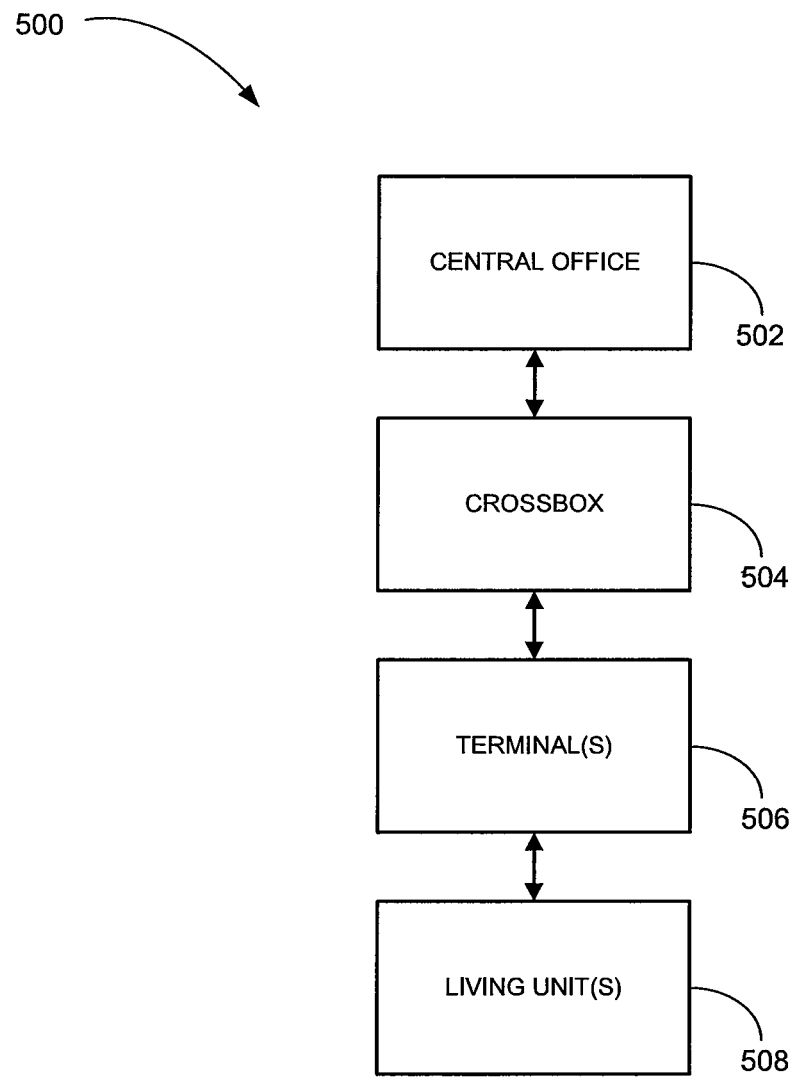
FIG. 5 is a block diagram of an example land-line telephone distribution chain, according to an example embodiment.

FIG. 5 illustrates an example land-line telephone distribution chain 500. The land-line telephone distribution chain 500 may demonstrate how one or more living units are provided with land-line telephone and/or other communication services. The service may be provided by the service provider 106 (see FIG. 1), or may be otherwise provided. The methods 300 (see FIG. 3), 400 (see FIG. 4) may be used to delineate figures associated with the providing of the land-line telephone service.

The land-line telephone distribution chain 500 may include one or more central offices 502. The central office 502 may be a wire center of an entity or organization associated with the service provider 106 of FIG. 1 that covers a large geographic area. The central office 502 may provide high-level call routing for the entity or organization. The central offices 502 may be in communication with one another by fiber or a different communication medium. The geographic areas may be split into one or more distribution areas.

Each of the central offices 502 may be in communication with one or more cross boxes 504. The cross box 504 may be an I-type remote terminal or a different type of cross box. The cross box 504 may be in communication with the central office 502 with fiber or a different communication medium.

Each of the cross boxes 504 may provide services to a separate distribution area associated with the central office 502. Thus, each of the central offices 502 may cover multiple distribution areas. In an example embodiment, each distribution area figure created by the operations at block 316 of FIG. 3 or block 420 of FIG. 4 may be associated with a single cross box 504.

One or more terminals 506 may be connected to the cross box 504. Typically, a number of terminals 506 are used to cover a distribution area served by the cross box 504.

One or more living units 508 may be connected to each of the terminals 506. For example, one to five living units 508 may receive land-line telephone services from a particular terminal 506. However, a greater or lesser number of living units may be served.

Figure 6:
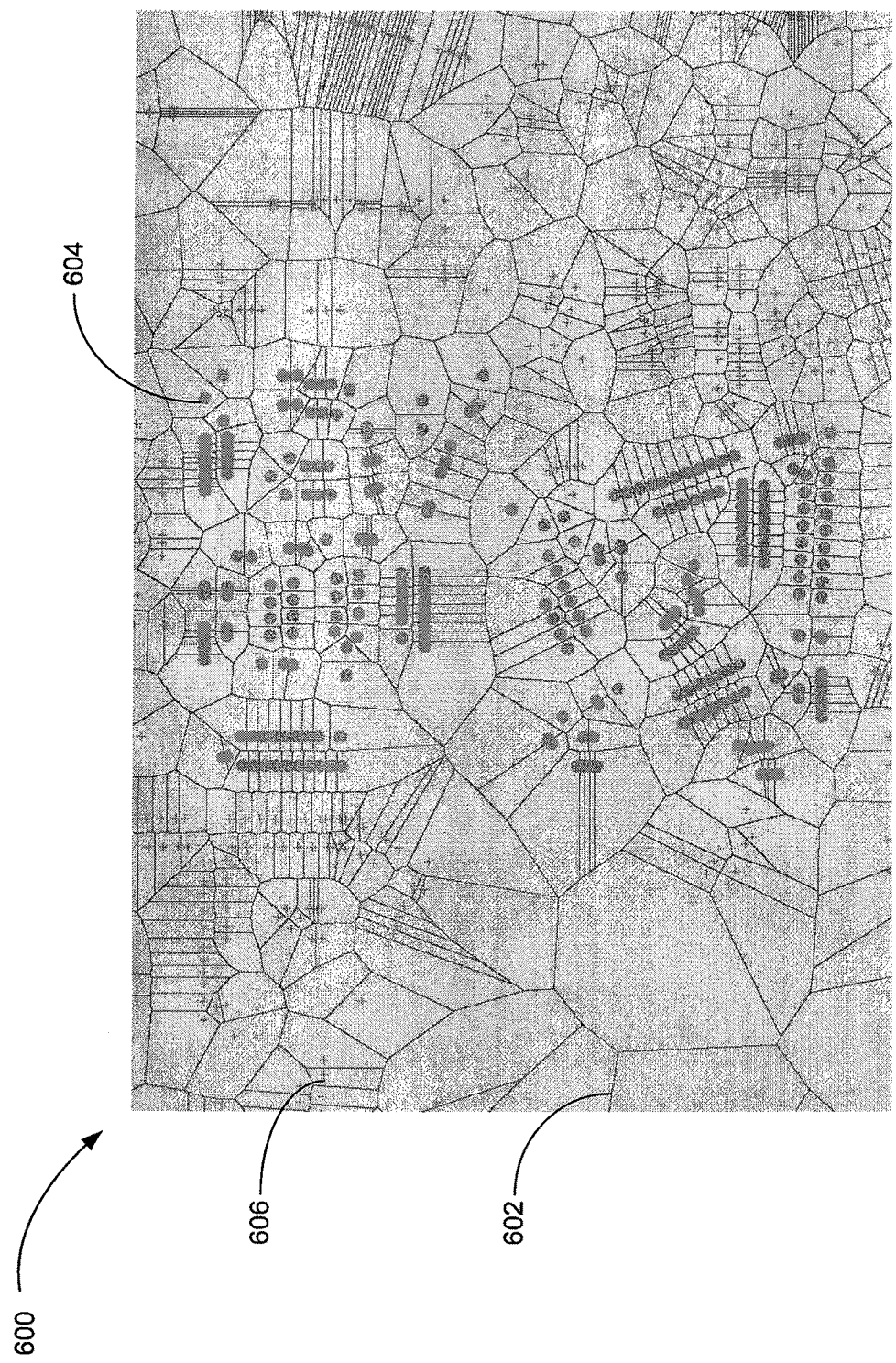
FIGS. 6-8 are illustrations of example boundary maps, according to example embodiments.

FIG. 6 is a diagram of a boundary map 600 according to an example embodiment. The boundary map 600 may be created as a result of performing one or more of the operations of the methods 300, 400 (see FIGS. 3 and 4). The boundary map 600 may reflect the delineation of closed plane living unit-based figures prior to merger into the distribution area figure. For example, the boundary map 600 may be rendered as a result of performing the operations at block 308 and block 314 or block 410 and block 418.

The boundary map 600 includes a number of closed plane living unit-based figures 602. The closed plane living unit-based figures 602 are shown in the form of Thiessen polygons. However, other types of figures may also be used.

The closed plane living unit-based figures 602 may include a current DA symbol 604 that indicates that the particular closed plane living unit-based figures 602 are associated with a currently viewed distribution area. Another DA symbol 606 may be included in other closed plane living unit-based figures 602 to reflect that the other closed plane living unit-based figures 602 are associated with another distribution area.

Figure 7:
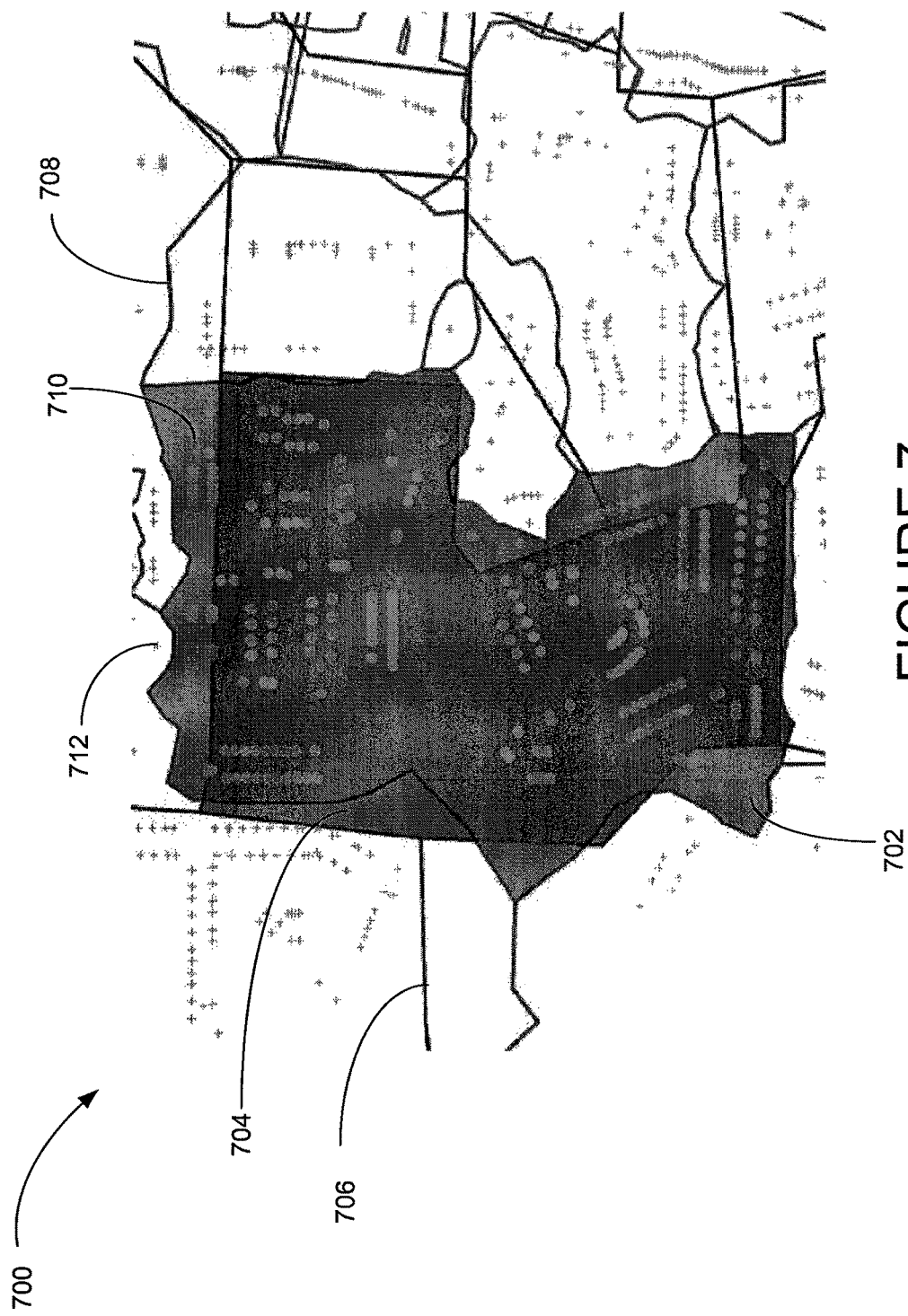

FIG. 7 is a diagram of a boundary map 700 according to an example embodiment. The boundary map 700 may be created as a result of performing one or more of the operations of the methods 300, 400 (see FIGS. 3 and 4). The boundary map 700 may include boundaries for distribution areas that identify where and how certain services are provided. The boundary map 700 may be used to determine how many living units are within a particular distribution area.

The boundary map 700 may reflect the addition of a new distribution area FIG. 702 to a boundary map that already includes a prior distribution area FIG. 704 that was created based on the wrong assignment of living units to DAs. For example, the new distribution area FIG. 702 may be added to the boundary map 700 as a result of performing the operations at block 320 and block 322 or block 424 and block 426. The boundary map 700 may be used, in an example embodiment, to determine an amount of error eliminated by using the methods 300, 400.

The boundary map 700 may include a prior boundary 706 and a new boundary 708. The prior boundary 706 may be associated with the prior distribution area FIG. 704 and reflect various prior DA boundaries. The new boundary 708 may be associated with the new distribution area FIG. 702 and reflect various new DA boundaries.

The new distribution area FIG. 702 may include a current DA symbol 710 (e.g., a green dot) that indicates living units within the new distribution area FIG. 702. Another DA symbol 712 (e.g., a grey cross) may be included to indicate living units outside of the new distribution area FIG. 702.

The boundary maps 600, 700 and other boundary maps that may be created by performing the methods 300, 400 may be used for providing telecommunication services, delivery services, analysis, or may be otherwise used.

Figure 8:
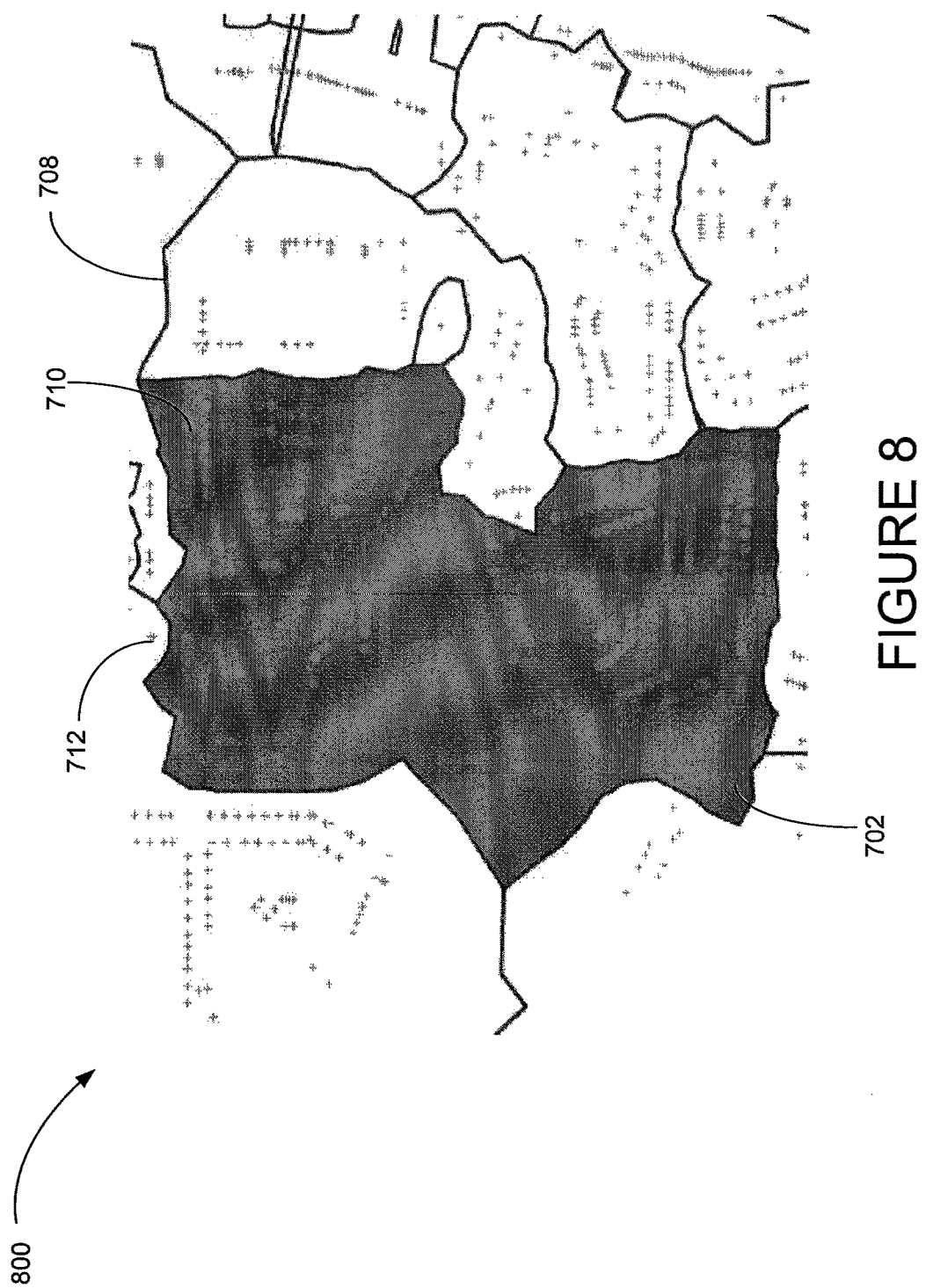

FIG. 8 is a diagram of a boundary map 800 according to an example embodiment. The boundary map 700 may be created as a result of performing one or more of the operations of the methods 300, 400 (see FIGS. 3 and 4). The boundary map 800 may include boundaries for distribution areas that identify where and how certain services are provided. The boundary map 800 may be used to determine how many living units are within a particular distribution area.

The boundary map 800 may include the new distribution area FIG. 702, the new boundary 708, the current DA symbol 710, and the DA symbol 712 of FIG. 7. The boundary may 800 may not include the prior distribution area FIG. 704 and it associated elements.

Figure 9:
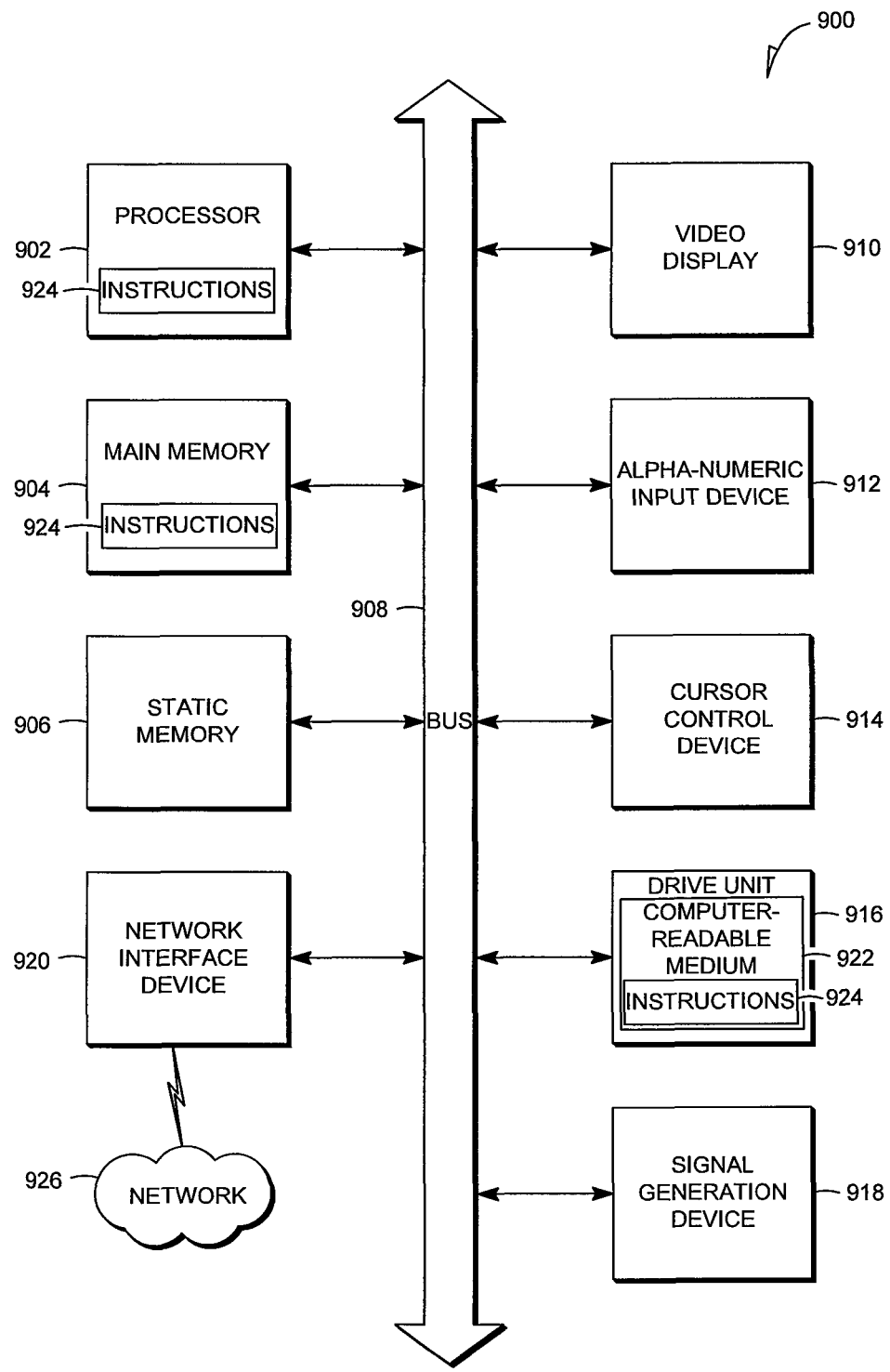
FIG. 9 is a block diagram of a machine in the example form of a computer system within which a set of instructions for causing the machine to perform any one or more of the methodologies discussed herein may be executed.

FIG. 9 shows a block diagram of a machine in the example form of a computer system 900 within which a set of instructions may be executed causing the machine to perform any one or more of the methods, processes, operations, or methodologies discussed herein. The service provider 106 of FIG. 1 and/or the geographic convertor may operate on one or more computer systems 900. The client machine 102 of FIG. 1 may include the functionality of the one or more computer systems 900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker) and a network interface device 920.

The drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may be implemented as hardware circuitry, optical components, single or multi-processor circuits, memory circuits, software program modules and objects, firmware, and combinations thereof, as appropriate for particular implementations of various embodiments.

In an example embodiment, a living unit identifier may be translated into a translated geographic location point. The living unit identifier may be within a distribution area. A closed plane living unit-based figure that bounds the translated geographic location point may be delineated. An additional closed plane living unit-based figure that bounds a geographic location point may be delineated. The geographic location point may be associated with an additional living unit identifier within the distribution area. The closed plane living unit-based figure and the additional closed plane living unit-based figure may be merged to create a distribution area figure of the distribution area.

In an example embodiment, a living unit identifier may be provided to a geographic convertor. The living unit identifier may be within a distribution area. A translated geographic location point may be received from the geographic convertor in response to the providing of the living unit identifier. A closed plane living unit-based figure that bounds the translated geographic location point may be delineated. An additional closed plane living unit-based figure that bounds a geographic location point may be delineated. The geographic location point associated with an additional living unit identifier may be within the distribution area. The closed plane living unit-based figure and the additional closed plane living unit-based figure may be merged to create a distribution area figure of the distribution area.

In an example embodiment, a boundary map may be rendered on a display device. A distribution area figure of a distribution area may be added to the boundary map. The distribution area figure may be a result of merging a closed plane living unit-based figure and an additional closed plane living unit-based figure.

Thus, methods and systems for boundary delineation have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method comprising:
   translating a first living unit identifier associated with a first living unit into a first geographic location point, the first geographic location point being within a distribution area serviced by a telecommunications services provider;
   delineating, with a processor, a first closed plane figure that bounds the first geographic location point, the delineating based on a plurality of geographic location points surrounding the first geographic location point, each of the plurality of geographic location points corresponding to a respective living unit identifier different from the first living unit identifier, wherein the first closed plane figure is a first Thiessen polygon;
   delineating, with the processor, a second closed plane figure that bounds a second geographic location point, the second geographic location point associated with a second living unit identifier corresponding to a second living unit within the distribution area; and
   creating a distribution area figure representing the distribution area serviced by the telecommunications services provider by joining the first closed plane figure and the second closed plane figure when the first living unit and the second living unit are serviced by a same cross-box.

2. The method of claim 1, wherein translating the first living unit identifier into the first geographic location point further comprises:
   accessing a mailing address of a user from a subscriber database; and
   converting the mailing address to the first living unit identifier.

3. The method of claim 1, further comprising:
   rendering a boundary map; and
   adding the distribution area figure to the boundary map.

4. The method of claim 3, further comprising delineating a plurality of distribution area boundaries on the boundary map, wherein the distribution area figure is within a particular distribution area boundary of the plurality of distribution area boundaries.

5. The method of claim 1, further comprising merging the distribution area figure of the distribution area and an additional distribution area figure of an additional distribution area to create a coverage area figure.

6. The method of claim 1, wherein land-line telephone service for a plurality of living units within the distribution area is served by the same cross-box, the plurality of living units endpoint identifiers including the first living unit and the second living unit.

7. The method of claim 1, wherein the first living unit identifier includes a mailing address of the first living unit.

8. The method of claim 1, wherein the first living unit identifier includes a telephone number associated with the first living unit.

9. The method of claim 1, wherein the distribution area figure is a distribution area polygon.

10. The method of claim 1, wherein the second polygon is a second Thiessen polygon.

11. The method of claim 1, wherein the distribution area is a land-line telephone distribution area.

12. The method of claim 1, wherein the Thiessen polygon has a boundary defined by a plurality of perpendicular bisectors of respective lines between the first geographic location point and respective ones of the plurality of geographic location points.

13. A method comprising:
   providing a first living unit identifier to a geographic convertor, the first living unit identifier identifying a first living unit located within a distribution area serviced by a land-line distribution service;
   delineating a first closed plane figure that bounds a first geographic location point received from the geographic converter in response to the providing of the first living unit identifier, the delineating based on a plurality of geographic location points surrounding the first geographic location point, each of the plurality of geographic location points associated with a respective living unit identifier different from the first living unit identifier, wherein the first closed plane figure is a first Thiessen polygon;

delineating a second closed plane figure that bounds a second geographic location point, the second geographic location point associated with a second living unit identifier identifying a second living unit located within the distribution area; and merging, with a processor, the first closed plane figure and the second closed plane figure to create a distribution area figure of the distribution area serviced by the land-line distribution service, the merging occurring when the first living unit and the second living unit are serviced by a same cross-box.

14. The method of claim 13, further comprising:
rendering a boundary map; and
adding the distribution area figure to the boundary map.

15. The method of claim 14, further comprising delineating a plurality of distribution area boundaries on the boundary map, wherein the distribution area figure is within a particular distribution area boundary of the plurality of distribution area boundaries.

16. The method of claim 13, wherein land-line telephone service for the first living unit and the second living unit are served by the same cross-box.

17. The method of claim 13, further comprising merging the distribution area figure of the distribution area and an additional distribution area figure of an additional distribution area to create a coverage area figure.

18. The method of claim 13, wherein the first closed plane figure is a polygon, the second closed plane figure is a second polygon, and the distribution area figure is a distribution area polygon.

19. The method of claim 13, wherein the second closed plane figure is a Thiessen polygon.

20. A tangible machine-readable medium comprising instructions, which when executed by one or more processors, cause the one or more processors to perform operations comprising:

translating a first living unit identifier associated with a first living unit into a first geographic location point, the first geographic location point being within a distribution area serviced by a telecommunications services provider;

delineating a first closed plane figure that bounds the first geographic location point based on a plurality of geographic location points surrounding the first geographic location point, each of the plurality of geographic location points associated with a respective living unit identifier, wherein the first closed plane figure is a first Thiessen polygon;

delineating a second closed plane figure that bounds a second geographic location point, the second geographic location point associated with a second living unit identifier associated with a second living unit within the distribution area; and creating a distribution area figure representing the distribution area serviced by the telecommunications services provider by joining the first closed plane figure and the second closed plane figure when the first living unit and the second living unit are serviced by a same cross-box.

21. The machine-readable medium of claim 20, wherein land-line telephone service for a plurality of living units within the distribution area is served by the same cross-box, the plurality of living units including the first living unit and the second living unit.

22. A tangible machine-readable medium comprising instructions, which when executed by one or more processors, cause the one or more processors to perform operations comprising:

delineating a first closed plane figure that bounds a first geographic location point within a distribution area serviced by a telecommunications service, the first geographic location point corresponding to a first living unit, the delineating based on a plurality of geographic location points surrounding the first geographic location point, the plurality of geographic location points associated with respective living units, wherein the first closed plane figure is a first Thiessen polygon;

delineating a second closed plane figure that bounds a second geographic location point, the second geographic location point associated with a second living unit located within the distribution area; and merging the first closed plane figure and the second closed plane figure to create a distribution area figure of the distribution area serviced by the telecommunications service, the merging occurring when the first living unit and the second living unit receive the telecommunications service from a same cross-box.

23. The machine-readable medium of claim 22, wherein land-line telephone service for a plurality of living units within the distribution area is served by the same cross-box, the plurality of living units including the first living unit and the second living unit.

24. A system comprising:
a graphic convertor to provide a first living unit identifier to a geographic convertor and receive a first geographic location point from the geographic convertor corresponding to the first living unit in response to the providing of the first living unit identifier, the first living unit identifier identifying a first living unit within a distribution area being serviced by a land-line telecommunications service;

a figure delineation processor to delineate a first closed plane figure that bounds the first geographic location point received by the graphic converter based on a plurality of geographic location points surrounding the first geographic location point, the plurality of geographic location points associated with respective living units, the figure delineation processor to delineate a second closed plane figure that bounds a second geographic location point, the second geographic location point being associated with a second living unit within the distribution area, wherein the first closed plane figure is a first Thiessen polygon; and a merger to merge the first closed plane figure and the second closed plane figure when the first living unit and the second living unit are serviced by a same cross-box to create a distribution area figure of the distribution area serviced by the land-line telecommunications service, at least one of the graphic converter, the figure delineation processor, and the merger being implemented by a logic circuit.

25. The system of claim 24, wherein the land-line telecommunications service for a plurality of living units within the distribution area is served by the same cross-box, the plurality of living units including the first living unit and the second living unit.

26. A method comprising:
rendering a boundary map on a display device; and adding a distribution area figure of a distribution area to the boundary map, the distribution area figure being a result of merging a first closed plane figure and a second closed plane figure serviced by a same cross-box of a telecommunications service provider, wherein:

the first closed plane figure represents a first area including a first living unit, the first closed plane figure created based on a first plurality of geographic location points surrounding the first living unit, each of the geographic location points in the first plurality associated with respective living units, wherein the first closed plane figure is a first Thiessen polygon; and the second closed plane figure represents a second area including a second living unit, the second closed plane figure created based on a second plurality of geographic location points surrounding the second living unit.

27. The method of claim 26, further comprising:

delineating the first closed plane figure that bounds the first living unit;

delineating the second closed plane figure that bounds the second living unit;

merging the first closed plane figure and the second closed plane figure to create the distribution area figure when the first and second living units are served by the same cross-box.

28. The method of claim 26, further comprising delineating a plurality of distribution area boundaries on the boundary map, wherein the distribution area figure is within a particular distribution area boundary of the plurality of distribution area boundaries.

29. The method of claim 26, further comprising merging the distribution area figure and an additional distribution area figure of an additional distribution area to create a coverage area figure.

30. The method of claim 26, wherein the first closed plane figure is a first polygon, the second closed plane-figure is a second polygon, and the distribution area figure is a distribution area polygon.

31. The method of claim 30, wherein the first polygon and the second polygon are Thiessen polygons.

32. A tangible machine-readable medium comprising instructions, which when executed, cause a machine to perform operations comprising:

rendering a boundary map on a display device; and adding a distribution area figure of a distribution area to the boundary map, the distribution area figure being added by merging a first closed plane figure and a second closed plane figure when a first living unit associated with the first closed plane figure and a second living unit associated with the second closed plane figure are serviced by a same cross-box, the distribution area being serviced by a telecommunications service provider, wherein:

the first closed plane figure represents a first area including a first living unit, the first closed plane figure created based on a first plurality of geographic location points surrounding the first living unit, each of the geographic location points in the first plurality associated with respective living units, wherein the first closed plane figure is a first Thiessen polygon; and the second closed plane figure represents a second area including a second living unit, the second closed plane figure created based on a second plurality of geographic location points surrounding the second geographic location point.

33. The machine-readable medium of claim 32 further comprising instructions, which when executed, cause a machine to at least:

delineate the first closed plane figure that bounds the first living unit;

delineate the second closed plane figure that bounds the second living unit;

merge the first closed plane figure and the second closed plane figure to create the distribution area figure.

* * * * *